United States Patent
Janky et al.

(10) Patent No.: US 7,403,853 B1
(45) Date of Patent: Jul. 22, 2008

(54) POSITION DETERMINATION SYSTEM FOR MOVABLE OBJECTS OR PERSONNEL USING GPS/TV LOCATION TECHNOLOGY INTEGRATED WITH INERTIAL NAVIGATION SYSTEM

(75) Inventors: James M. Janky, Los Altos, CA (US); Ralph Frederic Eschenbach, Woodside, CA (US)

(73) Assignee: Trimble Navigation, Ltd, Sunnyvale, CA (US)

( * ) Notice: Subject to any disclaimer, the term of this patent is extended or adjusted under 35 U.S.C. 154(b) by 269 days.

(21) Appl. No.: 11/200,919

(22) Filed: Aug. 9, 2005

Related U.S. Application Data

(63) Continuation of application No. 10/388,278, filed on Mar. 12, 2003, now Pat. No. 6,944,542.

(51) Int. Cl.
  *G06F 17/00* (2006.01)

(52) U.S. Cl. ........................ 701/220; 455/24

(58) Field of Classification Search ................. 701/220, 701/200, 207, 210, 213, 300; 340/988–989, 340/993; 455/575.6, 456.1, 456.6, 457, 24, 455/572

See application file for complete search history.

(56) References Cited

U.S. PATENT DOCUMENTS

| 5,510,801 | A | | 4/1996 | Engelbrecht et al. |
| 5,583,776 | A | * | 12/1996 | Levi et al. .................. 701/217 |
| 6,470,264 | B2 | * | 10/2002 | Bide .......................... 701/207 |
| 6,498,994 | B2 | * | 12/2002 | Vock et al. .................... 702/44 |
| 6,700,533 | B1 | * | 3/2004 | Werb et al. ............. 342/357.07 |
| 6,704,574 | B2 | * | 3/2004 | Lin ........................ 455/456.3 |
| 6,997,882 | B1 | * | 2/2006 | Parker et al. ................ 600/534 |
| 2004/0198387 | A1 | * | 10/2004 | Tsuji et al. ............... 455/456.1 |

* cited by examiner

*Primary Examiner*—Dalena Tran
(74) *Attorney, Agent, or Firm*—Boris G. Tankhilevich

(57) ABSTRACT

A position determination system for movable objects or personnel comprising at least one portable position sensor built into a wearable item of a member of personnel having an identification number, or embedded into a movable object having an identification number, and Mobile Initialization Station (MIS). The Mobile Initialization Station (MIS)/Portable Initialization Station (PIS) selected from the group consisting of: {(SATPS)/transceiver unit; (GPS)/transceiver unit; and a TVPS transceiver unit} is configured to provide a set of high accuracy initialization data. The portable position sensor is configured to utilize the high accuracy initialization data to generate and broadcast the positional data of at least one member of personnel having an identification number, or of at least one movable object having an identification number.

28 Claims, 4 Drawing Sheets

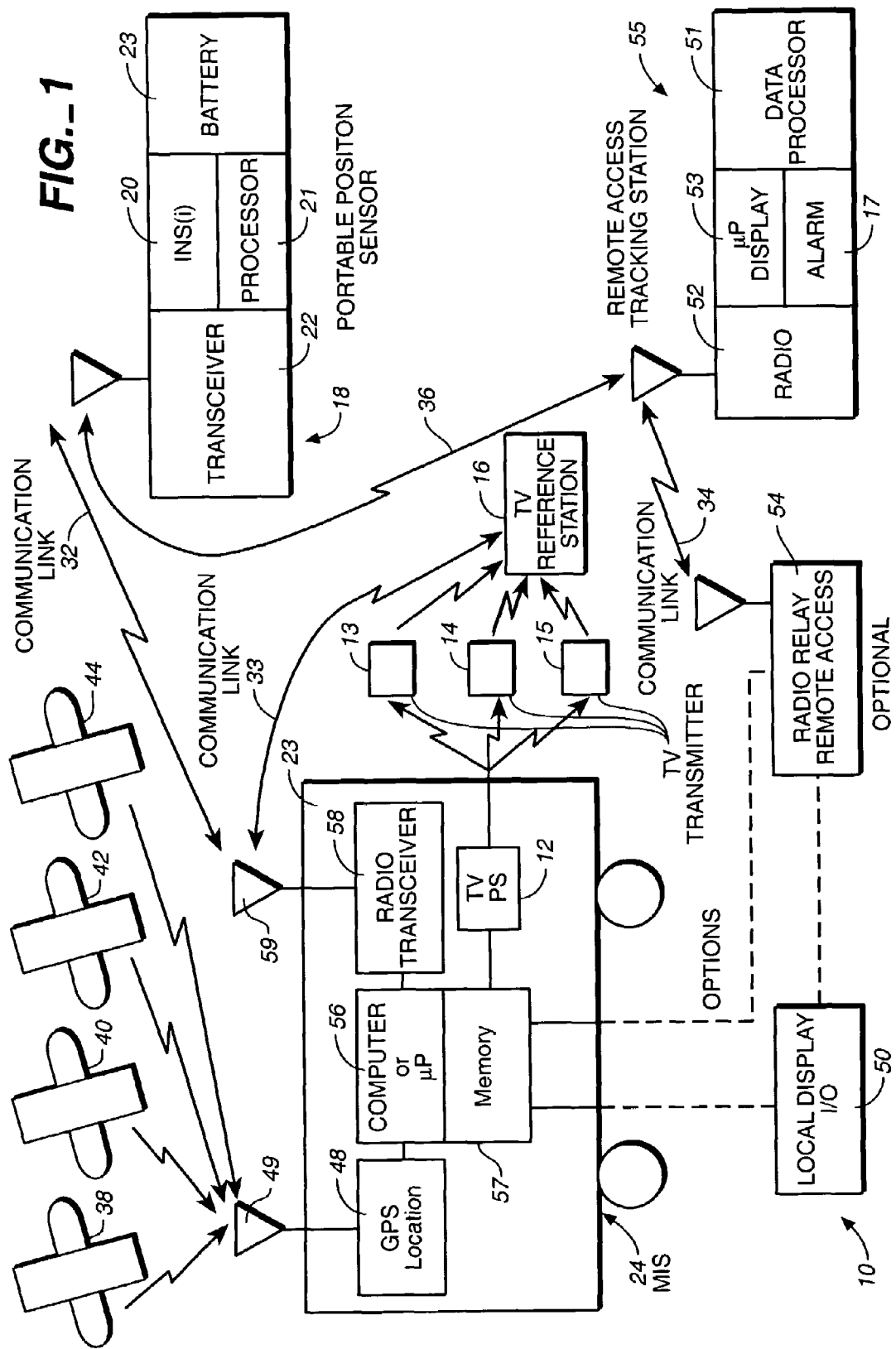
FIG._1

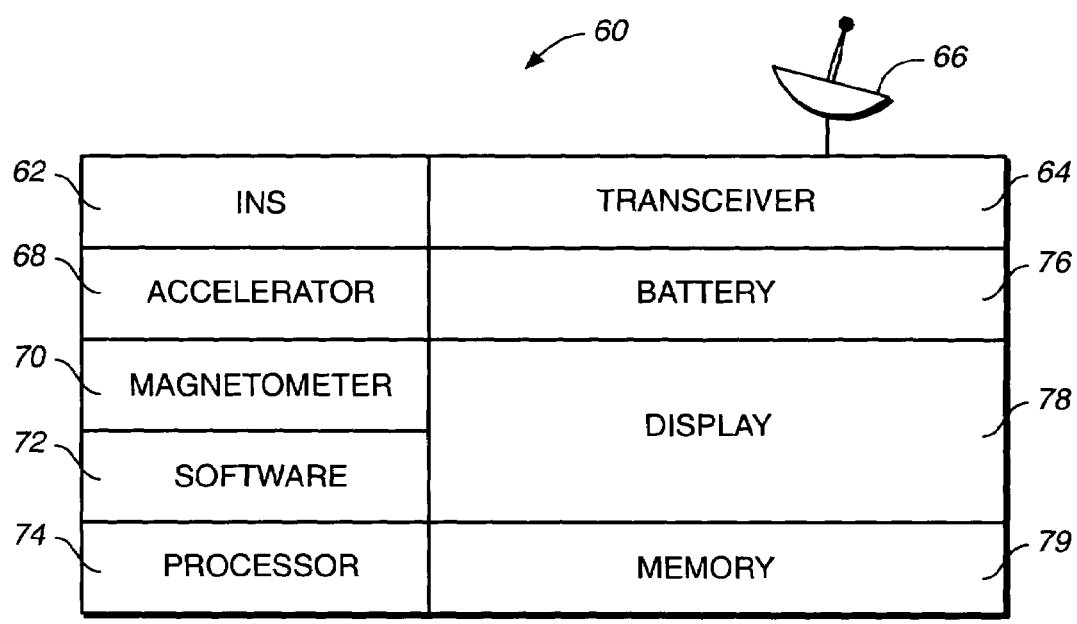
FIG._2

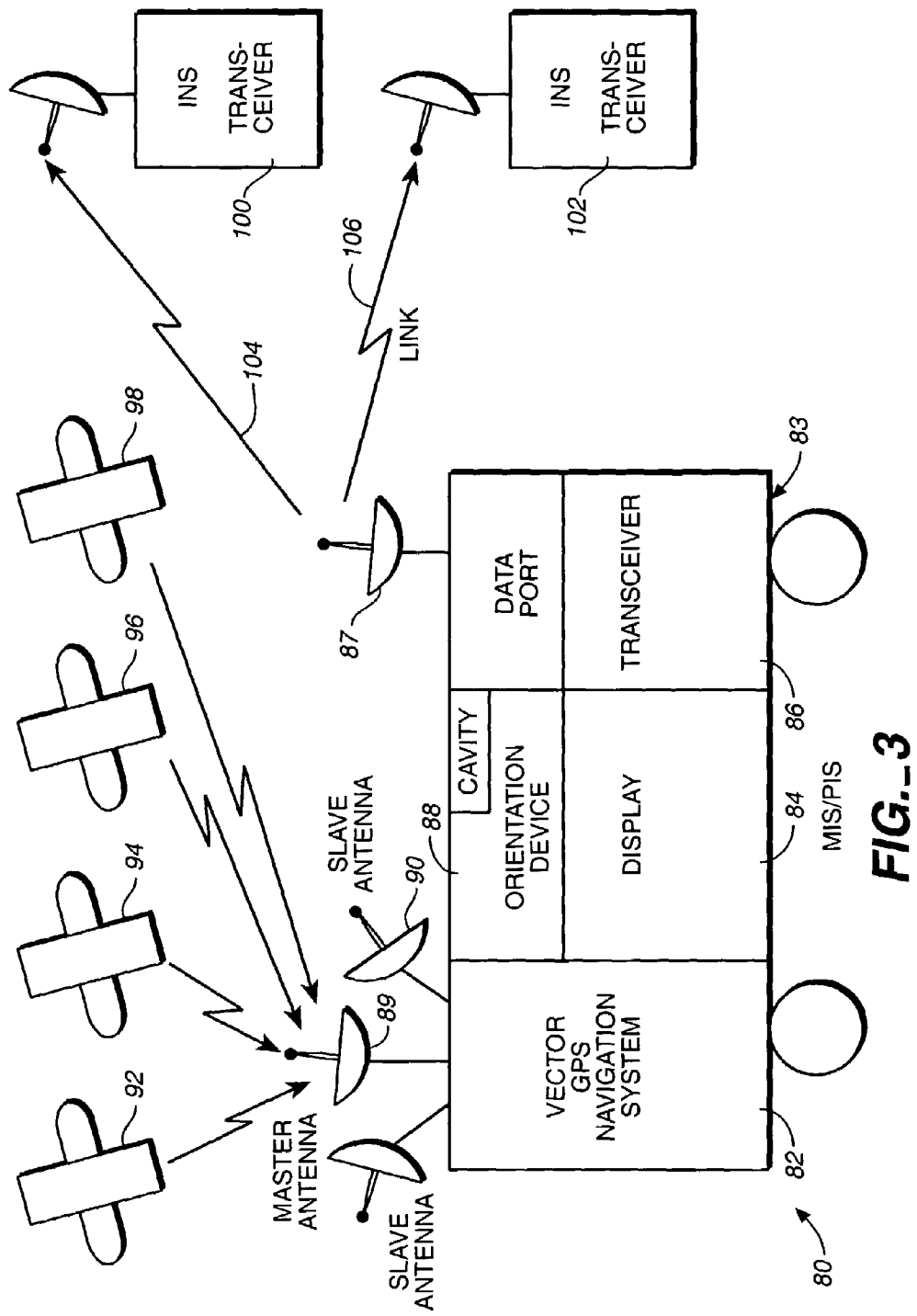
FIG._3

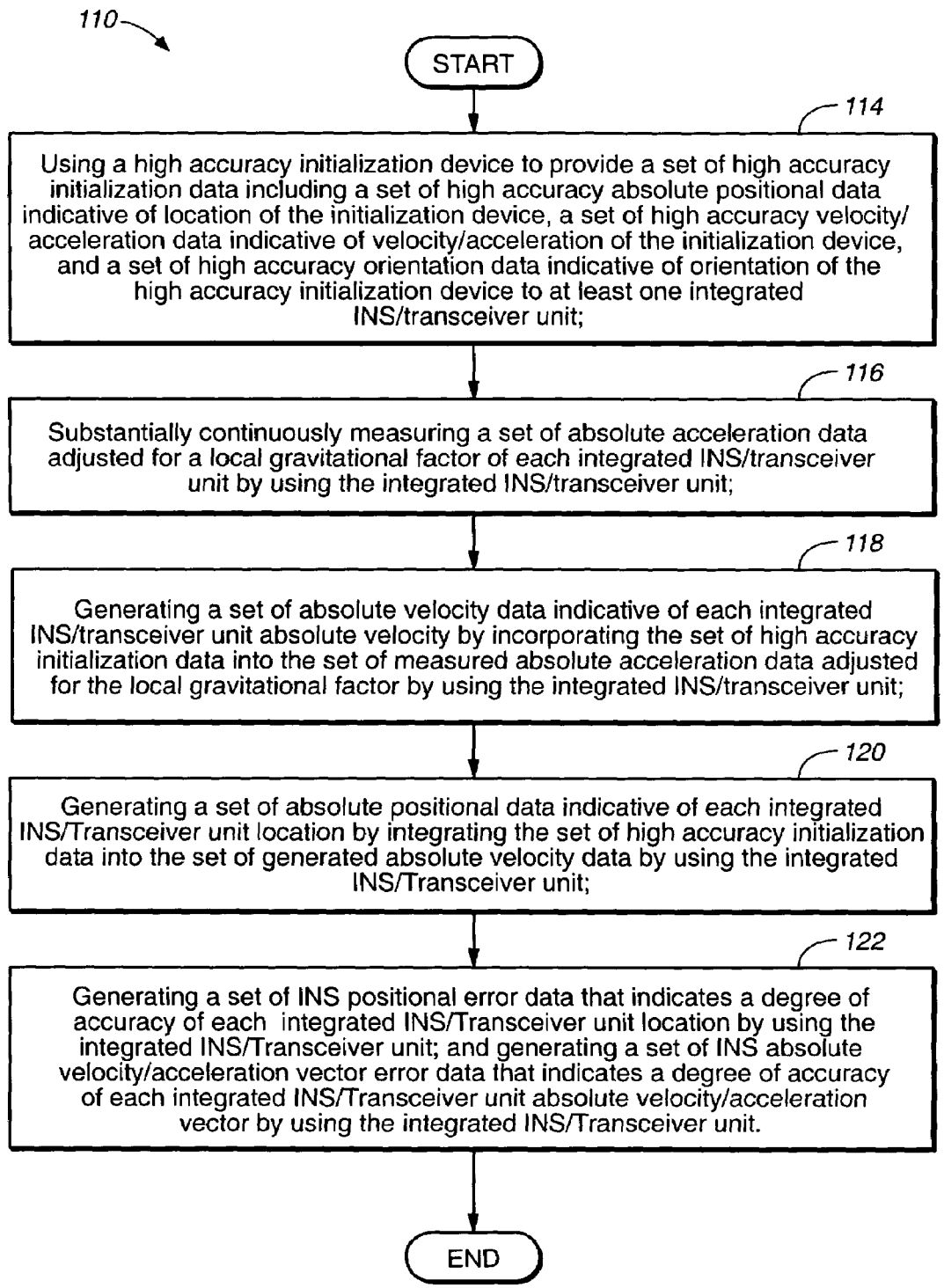
FIG._4

POSITION DETERMINATION SYSTEM FOR MOVABLE OBJECTS OR PERSONNEL USING GPS/TV LOCATION TECHNOLOGY INTEGRATED WITH INERTIAL NAVIGATION SYSTEM

This is a continuation-in-part of the U.S. patent application "POSITION DETERMINATION SYSTEM FOR MOVABLE OBJECTS OR PERSONNEL", Ser. No. 10/388,278, filed on Mar. 12, 2003 now U.S. Pat. No. 6,944,542.

BACKGROUND OF THE INVENTION

1. Field of the Invention

The present invention relates to the field of devices used for position determination, and more specifically, to the field of Inertial Navigation System (INS)-based position determination devices with enhanced accuracy.

2. Discussion of the Prior Art

It is important to keep track of public safety personnel as they perform their duties inside buildings or other obscured and often hazardous environments. Ideally, such a system would permit continues tracking of a large number of individuals, or movable objects, over a range of 1000-2000 feet from a tracking monitoring data collection point. In addition, other public safety personnel like policemen, or miners inside mines could benefit from such a position determination system, in that their position could be uniquely determined and sent from the in-vehicle position determination system via one of the radio systems back to headquarters for their own safety. Such position determination system could be also used to track a variety of robotic means deployed to operate in the various hazardous and obscured environments, or used to deal remotely with obscured dangerous items, etc.

The Satellite Positioning Systems (SATPSs), including the Global Positioning System (GPS), have not met the needs for tracking personnel with the availability and accuracy needed by the various management of these public safety agencies. Despite the work of various others, no products are available using SATPS (or GPS) as a wearable element in a personal position determination system.

Even the enhanced sensitivity systems, like a TV-based positioning system (TVPS), may encounter loss of signal in various types of buildings, such as very high rise skyscrapers, or in the deep mines. Indeed, even if enhanced sensitivity receivers can acquire signals, there is often a substantial reduction in accuracy. Furthermore, such enhanced sensitivity systems use much more power than new inertial navigation sensors. And there is the issues of the power needed to perform decent communications. The same is true in regard of tracking a variety of robotic means deployed to operate in the various hazardous and obscured environments.

Recent advances in Inertial Navigation Systems (INS) technologies makes it feasible to build a very small, low power INS system, that in combination with a similarly low power radio communications system such as embodied in a Bluetooth product, or an Ultra Wide Band (UWB) product, could provide a data link from the combination INS/Radio to a position determination system located in the fire truck, or in the police car, or in the ambulance, or in a portable station.

Thus, what is needed is to provide a mobile, or portable position determination system that receives the accelerator/velocity inputs from each uniquely identified personal INS/Radio system, and calculates a position estimate relative to the very accurate satellite-determined (or TVPS determined) position of the mobile, or portable station.

SUMMARY OF THE INVENTION

To address the shortcomings of the available art, the present invention provides for a mobile, or portable position determination system that receives the accelerator/velocity inputs from each uniquely identified personal INS/Radio system, and calculates a position estimate relative to the very accurate satellite-determined position of the mobile, or portable station.

One aspect of the present invention is directed to a position determination system for personnel members or movable objects.

In one embodiment of the present invention, the position determination system for personnel members or movable objects comprises: (1) at least one portable position sensor, and (2) a Mobile Initialization Station (MIS) capable of determining its position and velocity with high accuracy. In one embodiment of the present invention, each portable position sensor further comprises: (1a) an inertial navigation system (INS) module capable of determining its acceleration data adjusted for a local gravitational factor, (1b) a portable wireless communication module, and (1c) a power source adapted to provide power to the portable position sensor.

In one embodiment of the present invention, the high accuracy position and velocity data provided by the MIS and the acceleration data adjusted for the local gravitational factor provided by the portable position sensor is received and processed in order to derive an INS positional data corresponding to each INS module.

In one embodiment of the present invention, at least one portable position sensor is built into a wearable item of a member of the personnel having an identification number ID_Number. In another embodiment of the present invention, at least one portable position sensor is embedded into a movable object having an ID_Object_Number.

In one embodiment of the present invention, at least one portable position sensor further includes: a portable data processor, and a substantially continuous one-way communication link. The portable position sensor is configured to substantially continuously receive the high accuracy position and velocity data from the high accuracy position determination device by using the one-way communication link, wherein the portable data processor is configured to derive a set of INS positional data corresponding to the INS module based on the high accuracy position and velocity data provided by the high accuracy position determination device and based on the acceleration data adjusted for the local gravitational factor provided by the INS module. The portable data processor derives the set of INS positional data corresponding to the INS module (firstly) by incorporating the set of high accuracy velocity data provided by Mobile Initialization Station (MIS) into the set of measured absolute acceleration data adjusted for the local gravitational factor provided by the INS module in order to generate a set of absolute velocity data indicative of an absolute velocity of the INS module; and (secondly) by integrating the set of high accuracy positional data provided by Mobile Initialization Station (MIS) into the set of absolute velocity data in order to generate a set of INS data including a set of absolute positional data indicative of location of the INS module.

In one embodiment of the present invention, the portable data processor additionally generates a set of INS positional error data that indicates the degree of accuracy of the set of absolute INS positional data.

In one embodiment of the present invention, the portable data processor additionally generates a set of INS absolute velocity/acceleration vector error data that indicates the degree of accuracy of the absolute velocity/acceleration vector of the INS module.

In one embodiment of the present invention, at least one portable position sensor further includes a memory block that is configured to record the set of INS positional data corresponding to the INS module over a first time period. In another embodiment of the present invention, the memory block is further configured to record the set of INS positional error data that indicates the degree of accuracy of the set of absolute INS positional data over a second time period.

In one embodiment of the present invention, at least one portable position sensor further includes a display device configured to display the set of INS positional data corresponding to the INS module over a time period. In one embodiment of the present invention, at least one portable position sensor further includes a display device configured to display the set of INS positional data including a set of INS positional error data.

In one embodiment of the present invention, at least one portable position sensor further includes: a portable data processor, and a substantially continuous two-way communication link. The portable position sensor is configured (1) to substantially continuously receive the high accuracy position and velocity data provided by Mobile Initialization Station (MIS) by using the two-way communication link, (2) to derive a set of INS positional data corresponding to the INS module based on the high accuracy position and velocity data provided by Mobile Initialization Station (MIS) and based on the acceleration data adjusted for the local gravitational factor provided by the INS module, and (3) to substantially continuously broadcast the set of INS positional data corresponding to the INS module by using the two-way communication link. In one embodiment of the present invention, the portable position sensor is further configured (4) to substantially continuously broadcast the set of INS positional error data corresponding to the INS module by using the two-way communication link.

In one embodiment of the present invention, the one-way communication link further comprises a network of short range transceivers configured to support substantially continuous communication between the Mobile Initialization Station (MIS) and at least one portable position sensor.

In one embodiment of the present invention, the two-way communication link further comprises: a communication system selected from the group consisting of: {a Bluetooth communication system, an Ultra Wide Band (UWB) communication system, an (802.11 a) communication system, an (802.11 b) communication system, an (802.11 g) communication system, a LAN network, a WAN network, and a Wi-Fi network}.

In one embodiment of the present invention, the position determination system for personnel members or movable objects comprises: (1) at least one portable position sensor, (2) a Mobile Initialization Station (MIS) capable of determining its position and velocity with high accuracy, (3) a one-way communication link, and (4) a tracking station. In one embodiment of the present invention, each portable position sensor further comprises: (1a) an inertial navigation system (INS) module capable of determining its acceleration data adjusted for a local gravitational factor, (1b) a portable wireless communication module, and (1c) a power source adapted to provide power to the portable position sensor. In one embodiment of the present invention, the tracking station further includes a data processor configured to substantially continuously receive the high accuracy position and velocity data provided by Mobile Initialization Station (MIS) and the acceleration data adjusted for a local gravitational factor provided by each portable position sensor; and configured to derive an INS positional data including an INS positional error data corresponding to each INS module.

In one embodiment of the present invention, the tracking station further includes a display configured to display and to track each INS module based on the INS positional data including the INS positional error data corresponding to the INS module.

In one embodiment of the present invention, the tracking station is configured to substantially continuously communicate with each INS module using the two-way communication link. In one embodiment of the present invention, the tracking station further includes an alarm device configured to communicate to each INS module using the two-way communication link that its positional error data exceeds a predetermined threshold.

In one embodiment of the present invention, the Mobile Initialization Station (MIS) further comprises a Mobile Initialization Station (MIS) transceiver unit selected from the group consisting of: {an integrated Satellite Positioning System (SATPS)/transceiver unit; an integrated Global Positioning System (GPS)/transceiver unit; and a TV-based positioning system (TVPS) transceiver unit}; and a display device.

In one embodiment of the present invention, the Mobile Initialization Station (MIS) further comprises: an integrated Vector Global Positioning System (Vector GPS)/transceiver unit; a display device; and an orientation device. The integrated Vector Global Positioning System (Vector GPS) is configured to determine an orientation vector and a velocity vector of the MIS. In this embodiment, the orientation device is configured to use the orientation vector and the velocity vector of the MIS for an initial calibration of at least one portable position sensor, and for subsequent re-calibration of at least one portable position sensor at time instances when at least one portable position sensor includes a velocity vector substantially equal to the velocity vector of the MIS. In one embodiment, the orientation device further comprises a cavity configured to hold the integrated INS/transceiver for initial calibration or for subsequent re-calibration of the portable position sensor.

In one embodiment of the present invention, the Mobile Initialization Station (MIS) further comprises a Portable Initialization Station (PIS) further comprising a Portable Initialization Station (MIS) transceiver unit selected from the group consisting of: {an integrated Satellite Positioning System (SATPS)/transceiver unit; an integrated Global Positioning System (GPS)/transceiver unit; and a TV-based positioning system (TVPS) transceiver unit}; and a display device.

In one embodiment of the present invention, the Portable Initialization Station (PIS) further comprises an integrated Vector Global Positioning System (Vector GPS)/transceiver unit; a display device; and an orientation device. The integrated Vector Global Positioning System (Vector GPS) is configured to determine an orientation vector and a velocity vector of the PIS. In this embodiment, the orientation device is configured to use the orientation vector and the velocity vector of the PIS for an initial calibration of at least one portable position sensor, and for subsequent re-calibration of at least one portable position sensor at time instances when at least one portable position sensor includes a velocity vector substantially equal to the velocity vector of the PIS. In one embodiment, the orientation device further comprises a cavity configured to hold the integrated INS/transceiver for initial calibration or for subsequent re-calibration of the portable position sensor.

In one embodiment, at least one portable position sensor further comprises a low power miniature INS integrated with a short range transceiver and built into a wearable item selected from the group consisting of: {shoes; an article of clothing; and a watch}.

Another aspect of the present invention is directed to a method for tracking movable objects or personnel, wherein each movable object or a member of personnel includes a portable position sensor.

In one embodiment of the present invention, the method comprises the following steps: providing at least one portable position sensor, wherein each portable position sensor further comprises an inertial navigation system (INS) module; using the INS module to determine its acceleration data adjusted for a local gravitational factor; using a Mobile Initialization Station (MIS)/Portable Initialization Station (PIS) to determine its position and velocity with high accuracy; and processing the high accuracy position and velocity data provided by the MIS/PIS and the acceleration data adjusted for the local gravitational factor provided by a portable position sensor to derive an INS positional data corresponding to each INS module.

In one embodiment of the present invention, the method further comprises the following step of substantially continuously broadcasting each set of INS data including the set of absolute positional data indicative of an INS module location by using at least one communication link between the INS module and the Mobile Initialization Station (MIS) or the Portable Initialization Station (PIS).

In one embodiment of the present invention, the method further comprises the following step of substantially continuously broadcasting each set of INS data including a set of absolute velocity/acceleration data indicative of the INS module absolute velocity/acceleration using at least one communication link between the INS module and the MIS/PIS.

In one embodiment of the present invention, the method further comprises the following steps: substantially continuously broadcasting the set of INS positional error data by using at least one communication link between an INS module and the MIS/PIS; and substantially continuously broadcasting the set of INS absolute velocity/acceleration vector error data by using at least one communication link between the INS module and the MIS/PIS.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a position determination system for personnel members or movable objects of the present invention.

FIG. 2 illustrates a portable position sensor of the present invention including a small, light weight, wearable Inertial Navigation System (INS) including a number of accelerometers, a number of magnetometers, a processor, and a specifically designed software.

FIG. 3 depicts the position determination system for personnel members or movable objects of the present invention including an integrated Vector Global Positioning System (Vector GPS) navigation unit, a master GPS antenna, two slave GPS antennas, a transceiver unit including a transceiver antenna, a display device, and an orientation device housed in a vehicle or in a portable unit.

FIG. 4 is a flow chart that illustrates the steps of operation of the position determination system of FIG. 1 in one embodiment of the present invention.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment of the present invention, FIG. 1 depicts a position determination system for personnel members or movable objects 10 of the present invention comprising: at least one portable position sensor 18; and a Mobile Initialization Station (MIS) 24 capable of determining its position and velocity with high accuracy. In one embodiment of the present invention, each portable position sensor 18 further comprises: an inertial navigation system (INS) module 20 capable of determining its acceleration data adjusted for a local gravitational factor; a portable wireless communication module 22; and a power source 23 adapted to provide power to the portable position sensor. In one embodiment of the present invention, at least one portable position sensor 18 is built into a wearable item of a member of the personnel having an identification number ID_Number. In another embodiment of the present invention, at least one portable position sensor 18 is embedded into a movable object having an ID_Object_Number.

Referring still to FIG. 1, in one embodiment of the present invention, the Mobile Initialization Station (MIS) includes a Satellite Positioning System (SATPS) 48 including a satellite antenna 49, a transceiver unit 58, and a display device 50 housed in a vehicle 23.

Referring still to FIG. 1, in another embodiment of the Mobile Initialization Station (MIS) further including: an integrated Global Positioning System (GPS) navigation system 48, a transceiver unit 58, and a display device 50 housed in a vehicle 23.

For the purposes of the present invention, the vehicle 23 is, for example, a fire truck, or an ambulance, or a police vehicle, or any one of numerous other types of vehicles as well.

Referring still to FIG. 1, in one embodiment of the present invention, the MIS 24 further comprises a Portable Initialization Station (PIS) further including: an integrated Satellite Positioning System (SATPS)/transceiver unit 48 and a display device 50. In another embodiment of the present invention, the portable initialization station (PIS) further includes an integrated Global Positioning System (GPS)/transceiver unit 48, and a display device 50.

Referring still to FIG. 1, in one embodiment of the present invention, the Portable Initialization Station (PIS) includes a removably attachable portable data terminal (not shown) that can perform all of the functions of the PIS when disposed within MIS 24 and when removed from MIS 24.

The Global Positioning System (GPS) is a system of satellite signal transmitters that transmits information from which an observer's present location and/or the time of observation can be determined. Another satellite-based navigation system is called the Global Orbiting Navigation System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (nineteen centimeter carrier wavelength) and an L2 signal having a frequency $f2=1227.6$ MHz (twenty-four centimeter carrier wavelength). These two frequencies are integral multiplies $f1=1,540\ f0$ and $f2=1,200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of $f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.80 relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where $k (=1, 2, \ldots 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

In alternative embodiments, the present invention is also well suited to land-based radio navigation systems such as, for example, LORAN, Shoran, Decca, and TACAN (not shown).

Referring still to FIG. 1, the four satellite-vehicles 38, 40, 42, and 44 comprise a minimum number of satellites needed for enablement of the present invention.

Referring still to FIG. 1, in one embodiment of the present invention, the MIS 24 includes a TV-based position determination receiver 12 that is configured to receive the TV signals from at least three TV transmitters 13, 14, and 15.

Indeed, according to the U.S. Pat. No. 5,510,801, the TV-based position determination receiver 12 (of FIG. 1) can derive the position coordinates of the Mobile Initialization Station (MIS) 24 by using the signals broadcasted by at least three fixed commercial television stations 13, 14, and 15. The U.S. Pat. No. 5,510,801 is incorporated herein in its entirety.

According to the '801 patent, it is assumed that each television station 13, 14, or 15, should be able to broadcast standard television signals, including horizontal, vertical and chrominance burst synchronizing signals. The standard television signals broadcasted by 13, 14, or 15 television stations are received by the TV-location determination device 12 (of FIG. 1) that comprises a TV-receiver (not shown). The times of arrival synchronizing signals of the selected television stations 13, 14, and 15 are measured at the MIS 24.

A fixed reference station 16 also receives the television signals broadcasted by 13, 14, or 15 fixed commercial television stations and detects any frequency and wavelength drift in the standard television signals from each of the fixed commercial television stations 13, 14, or 15, respectively. The fixed reference station 16 produces reference receiver correction signals and sends the correction signals to the MIS 24 by using the communication link 33.

A processor, which may be at the reference station (not shown) or at the MIS 24 (for instance, computer 56), computes the location of the MIS 24 by using the TV signals broadcasted by the TV stations 13, 14, and 15, and by using the correction signals broadcasted by the TV Reference station 16. TV signals have certain advantages:

(1) A very high power is usually employed in metropolitan areas to insure good program coverage. The TV-based position determination system (TVPS) can therefore operate over the wide area covered by TV.

(2) The TVPS uses the repetitive information (not the variable information) requiring a low bandwidth. Signals marginal for video purposes can be extremely useful for location purposes.

(3) The signal format utilized by the television stations is uniform (specified by the FCC) permitting uniform measurement equipment and approaches in the U.S. The TVPS system can in fact utilize technology employed in current portable TV receivers for the extraction of timing signals permitting a low cost receiver.

(4) The signal format utilized by the TV stations is highly stable and accurate, permitting simple differential implementation of the location determination process. (If the signal formats were not stable and accurate, synchronized timing signals could be utilized to achieve location determination.)

Referring still to FIG. 1, in one embodiment of the present invention, the portable position sensor 18 is configured to substantially continuously receive the high accuracy position and velocity data from the MIS 24 by using the one-way communication link 32 and to process all data locally using a portable data processor 21. More specifically, the portable data processor 21 is configured to derive a set of INS positional data corresponding to the INS module 18 based on the high accuracy position and velocity data provided by the MIS 24 and based on the acceleration data adjusted for the local gravitational factor provided by the INS module 20. The portable data processor 21 derives the set of INS positional data corresponding to the INS module by incorporating the set of high accuracy velocity data provided by the high accuracy position determination device into the set of measured absolute acceleration data adjusted for the local gravitational factor provided by the INS module in order to generate a set of absolute velocity data indicative of an absolute velocity of the INS module. At the next step (please, see full discussion below), the portable data processor 21 integrates the set of high accuracy positional data provided by the MIS 24 into the set of absolute velocity data in order to generate a set of INS data including a set of absolute positional data indicative of location of the INS module 20. In one embodiment of the present invention, the portable data processor 21 additionally generates a set of INS positional error data that indicates the degree of accuracy of the set of absolute INS positional data. In one embodiment of the present invention, the portable data processor 21 additionally generates a set of INS absolute velocity/acceleration vector error data that indicates the degree of accuracy of the absolute velocity/acceleration vector of the INS module 20. Please, see discussion below.

Referring still to FIG. 1, in one embodiment of the present invention, at least one portable position sensor 18 is configured at first, to substantially continuously receive the high accuracy position and velocity data provided by the MIS 24 by using the one-way, or the two-way communication link 32; secondly, to derive a set of INS positional data corresponding to the INS module 20 based on the high accuracy position and velocity data provided by the MIS 24 and based on the acceleration data adjusted for the local gravitational factor provided by the INS module 20; and thirdly, to substantially continuously broadcast the set of INS positional data corresponding to the INS module by using the one-way, or the two-way communication link 34 to the remote access radio relay 54, or to the remote access tracking station 55 by using the one-way, or the two-way communication link 36.

In one embodiment of the present invention, the portable position sensor 18 is further configured to substantially continuously broadcast the set of INS positional error data corresponding to the INS module by using the communication links 34 and 36.

In one embodiment of the present invention, as shown in FIG. 2, a small light weight, wearable Inertial Navigation System (INS) 62 is built by using a combination of accelerometers 68, magnetometers 70, a processor 74, and a specifically designed software 72.

Acceleron Technology, Inc., located in San Francisco, Calif., has built small light weight, wearable Inertial Navigation System (INS) using three accelerometers to measure three components of the local acceleration vector, three magnetometers to measure three components of the local gravitational vector, plus some software. An accelerometer is a sensor that measures acceleration, speed and the distance by mathematically determining acceleration over time. Basically, if it is known how fast the member of the personnel or a movable object/robot is accelerating for a certain time period, it is easy to calculate how much the speed changed after that time period. The distance is measured in the same fashion: if it is known how fast a member of the personnel or a movable object/robot is moving for a certain time period, it is easy to calculate the distance traveled during that time.

A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems", published by American Institute of Aeronautics and Astronautics, Inc, 2000, by Robert M. Rogers.

Indeed, the "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how a moving person/object's position change in geographical coordinates is related to the local Earth relative velocity and Earth curvature. The "Applied Mathematics in Integrated Navigation Systems" also teaches how to develop the functional characteristics of inertial sensors used in navigation systems, how to develop the time-varying dynamic error models for inertial sensors random errors. The "Applied Mathematics in Integrated Navigation Systems" is incorporated herein in its entirety.

In one embodiment of the present invention, as shown in FIG. 2, the portable position sensor 60 further comprises a low power miniature INS 62 integrated with a short range transceiver 64 having an antenna 66. In one embodiment of the present invention, a small light weight, wearable Inertial Navigation System (INS) built into an article of clothing, shoes, watch, etc. of a member of the personnel, or embedded permanently into the housing of a movable object, or a robot.

In one embodiment of the present invention, at least one portable position sensor 60 (of FIG. 2) further includes a memory block 79 that is configured to record the set of INS positional data corresponding to the INS module over a first time period. In another embodiment of the present invention, the memory block 79 is further configured to record the set of INS positional error data that indicates the degree of accuracy of the set of absolute INS positional data over a second time period.

Referring still to FIG. 2, in one embodiment of the present invention, at least one portable position sensor 60 further includes a display device 78 configured to display the set of INS positional data corresponding to the INS module over a time period. In one embodiment of the present invention, at least one portable position sensor further includes a display device 78 configured to display the set of INS positional data including a set of INS positional error data.

In one embodiment of the present invention, the one-way communication link further comprises a network of short range transceivers configured to support substantially continuous communication between the high accuracy position determination device and at least one portable position sensor.

In one embodiment of the present invention, the two-way communication link further comprises: a communication system selected from the group consisting of: {a Bluetooth communication system, an Ultra Wide Band (UWB) communication system, an (802.11 a) communication system, an (802.11 b) communication system, an (802.11 g) communication system, a LAN network, a WAN network, and a Wi-Fi network}.

In the present invention, each communication link (32, 34, or 36) can be established in one of many ways. For example, at least one of communication links 32 can be established using a Metricomm Wide Area Network (WAN) link operating at approximately 900 MHz, by using a trunked radio system, or by using a Cellular Digital Packet Data (CDPD) protocol. In the CDPD protocol, a modem and a radio are used to send data at a rate of 19.2 Kbits/s over cellular circuits not currently being used for voice transmissions. A control channel is called, and the user is assigned a channel. Communication node then bursts packet data, using, for example, ECP/IP protocol, to deliver the data to each portable position sensor 18 until the data is completely transmitted or until the channel is no longer free. If the data is not completely transferred when the channel expires, at least one communication link 32 is then established using a different channel. The communication link 32 can be part of a local area network (LAN), or a part of a wireless radio link to any other remote location, or a part of a wireless radio link to the Internet.

In one embodiment of the present invention, at least one two-way communication link (32, 34, or 36) further comprises a 802.11 a, b, or g communication system. 802.11 (a, b, or g) communication system is a wireless LAN system based on the Institute of Electrical and Electronics Engineers standards for 802.11 Wi-Fi technologies with a range up to 3,000 feet.

Referring still to FIG. 1, in one embodiment of the present invention, at least one two-way communication link (32, 34, or 36) further comprises a Bluetooth communication system. The Bluetooth communication system developed by Ericsson and other companies comprises a global technology specification for low-cost, small from-actor, wireless communication and networking between different devices. The range of Bluetooth which is typically 30 feet can be extended up to 300 feet if optional amplifiers are placed at strategic locations within a building. The elimination of cables makes for a safer work environment, since there are no cables for people to trip over and unplug. Besides elimination of cables, the Bluetooth wireless technology also enables devices to communicate with each other as soon as they come within range, rather than requiring the user to open an application or press a button to initiate a process. The Bluetooth wireless technology does not have to be set up—it is always running in the background. The complete description of the Bluetooth wireless technology can be found in the "Bluetooth Demystified" by Nathan J. Muller, published by McGraw-Hill in 2001.

Referring still to FIG. 1, in one embodiment of the present invention, at least one two-way communication link (32, 34, or 36) further comprises an Ultra Wide Band (UWB) wireless communication system.

Referring still to FIG. 1, in one embodiment of the present invention, the communication link (32, 34, or 36) further comprises a first one-way communication link, and a second one-way communication link. In one embodiment, the first one-way communication link further comprises a Bluetooth communication system, or a 802.11 a, b, or g communication system, or an UWB communication system. In one embodiment, the second one-way communication link further comprises a Bluetooth communication system, or a 802.11 a, b, or g communication system, or an UWB communication system.

Referring still to FIG. 1, in one embodiment of the present invention, the position determination system for personnel members or movable objects comprises: at least one portable position sensor 18; Mobile Initialization Station (MIS) 24 capable of determining its position and velocity with high accuracy; a one-way communication link (32 and/or 36); and a tracking station 55.

In one embodiment of the present invention, each portable position sensor further comprises: an inertial navigation system (INS) module 20 capable of determining its acceleration data adjusted for a local gravitational factor; a portable wireless communication module 22, and a power source 23 adapted to provide power to the portable position sensor. In this embodiment, the portable position sensor 18 does not include the processor 21. Instead, in this embodiment of the present invention, the tracking station 55 further includes a data processor 51 configured to substantially continuously receive the high accuracy position and velocity data provided by the MIS 24 by using the communication link 34, and the acceleration data adjusted for a local gravitational factor provided by each portable position sensor 18 by using the communication link 36; and configured to derive an INS positional data including an INS positional error data corresponding to each INS module 20.

In one embodiment of the present invention, the tracking station 55 further includes a display 53 configured to display and to track each INS module 20 based on the INS positional data including the INS positional error data corresponding to the INS module.

In one embodiment of the present invention, the tracking station, after deriving the position coordinates for INS module 20, is configured to substantially continuously communicate to the INS module 20 using the radio 52 and the communication link 36 its position coordinates. In one embodiment of the present invention, the tracking station 55 further includes an alarm device 17 configured to communicate to each INS module 20 using the communication link 36 that its positional error data exceeds a predetermined threshold.

In one embodiment of the present invention, FIG. 3 depicts the MIS 80 including: an integrated Vector Global Positioning System (Vector GPS) navigation unit 82, a master GPS antenna 89, two slave GPS antennas 88 and 90, a transceiver unit 86 including a transceiver antenna 87, a display device 84, and an orientation device 88 housed in a vehicle 83. In the present embodiment, the vehicle 83 is, for example, a fire truck, or an ambulance, or a police vehicle, or any one of numerous other types of vehicles as well.

As shown in FIG. 3, the integrated Vector Global Positioning System (Vector GPS) is configured to determine an orientation vector and a velocity vector of the MIS 80. In the U.S. Pat. No. 6,154,170 issued to Dentinger, et al., the enhanced attitude determination system using satellite navigation receiver with antenna multiplexing is disclosed. The '170 patent includes the position, velocity, time (PVT) and attitude (ATT) measurement system including a Master GPS antenna and a plurality of Slave GPS antennas. The system of '170 patent comprises a hardware PVT channel and a hardware ATT channel. After the Master GPS antenna is selected, the hardware PVT channel stays locked on the Master antenna during the measurement time thus optimizing the accuracy of the PVT data. The PVT channel performs the tracking of the visible GPS satellites and generates the tracking data and the PVT data. The ATT channel performs the attitude measurement using all Slave antennas and the PVT tracking data.

Referring still to FIG. 3, in one embodiment of the present invention, the orientation device 88 is configured to use the orientation vector and the velocity vector of the MIS 80 for an initial calibration of at least one portable position sensor (100, 102) or for subsequent re-calibration of at least one portable position sensor (100, 102) at time instances when the portable position sensor includes a velocity vector substantially equal to the velocity vector of the MIS 80. In one embodiment of the present invention, the orientation device 88 further comprises a cavity 89 configured to hold the integrated INS/transceiver for initial calibration or for subsequent re-calibration of the portable position sensor.

Referring still to FIG. 3, in one embodiment of the present invention, the MIS 80 further comprises a Portable Initialization Station (PIS) further including: an integrated Vector Global Positioning System (Vector GPS)/transceiver unit 82, a master GPS antenna 89, two slave GPS antennas 88 and 90, a display device 84, and an orientation device 88. In this embodiment, the integrated Vector Global Positioning System (Vector GPS) is configured to determine an orientation vector of the PIS. In one embodiment, the orientation device includes a cavity that can be used for an initial calibration, or for subsequent re-calibration of at least one portable position sensor 100 or 102.

In one embodiment, if the position determination system of the present invention includes a Vector GPS navigation system (82 of FIG. 3), the MIS 80 is configured to provide each portable position sensor (100 through 102) with a set of high accuracy orientation data indicative of orientation of the high accuracy position determination device 83 by using a two-way communication link (104 or 106), or by using at least one one-way communication link (104 or 106).

As shown in FIG. 1, a more detailed schematic block diagram of MIS 24 includes a transceiver 58 having an antenna 59 attached thereto, a signal processor 56, a memory 57, and a display unit 50. In the present embodiment, memory 57 stores, for example, previously displayed tracking data, and the level of errors, and the allowable positioning error threshold (please, see discussion below). Although the tracking data is immediately displayed in the display 50, it can be also stored in memory 57, and also transmitted over each communication link 32 to each member of the personnel or to each movable object/robot, synchronously, or at a later time. The position determination system of the present invention is also able to update previously recorded tracking information after subsequent re-initialization. See discussion below.

In one embodiment of the present invention, in operation, the position determination system 10 (of FIG. 1) performs the following steps, as shown in flowchart 110 of FIG. 4. At step 114, the MIS (24 of FIG. 1) utilizes the satellite navigation device (48 of FIG. 1), or the TVPS device (12 of FIG. 1), to obtain a set of high accuracy initialization data including a set of high accuracy absolute positional data indicative of location of the initialization device, and a set of high accuracy velocity/acceleration data indicative of velocity/acceleration of the initialization device. If the MIS (24 of FIG. 1) employs the vector GPS navigation device (82 of FIG. 3), in addition to the high accuracy positional and velocity/acceleration data, a set of high accuracy orientation data indicative of orientation of the high accuracy position determination device is available.

At the step 116, each INS substantially continuously measures a set of absolute acceleration data adjusted for a local gravitational factor, and generates (at step 118) a set of absolute velocity data indicative of each portable position sensor absolute velocity by incorporating the set of high accuracy initialization data into the set of measured absolute acceleration data adjusted for the local gravitational factor. At step 120, each INS generates a set of absolute positional data indicative of one INS portable position sensor location by integrating the set of high accuracy initialization data into the set of generated absolute velocity data. Finally, at step 122, each INS generates a set of INS positional error data that indicates a degree of accuracy of each portable position sensor location.

EXAMPLE I

Each member of the personnel has its personal INS/transceiver integrated unit that is powered when the member puts on his boots, and gets in a vehicle to drive to the location of fire, accident, etc. At this time, when the velocity vector of the MIS and the velocity vector of the member of the personnel is the same, the high accuracy initialization data is transmitted to the wearable personal INS located in the boots. On the travel to the fire, the correlation is made between MIS and the boots because they are both traveling about the same speed in the same direction for a period of time. This allows the boot to confirm that it is on the vehicle, and since the vehicle has a GPS, or TVPS, or both, the boot can initialize to the same position as the vehicle. When the vehicle stops, and the fireman jumps off, the INS is initialized and starts integrating acceleration to generate a continuous position. This position is received by the vehicle in the fleet. If the fireman gets on another vehicle to go to another side of the fire, this calibration cannot occur with another vehicle until the fireman has ridden on the vehicle and they have shared a common velocity profile. Using the communication link 32, the high accuracy data is transmitted to at least one described above portable position sensor 18.

In one embodiment (not shown), each INS also generates a set of INS absolute velocity/acceleration vector error data that indicates a degree of accuracy of each portable position sensor absolute velocity/acceleration vector. In one embodiment (not shown), each INS module substantially continuously broadcasts each set of INS data including the set of absolute positional data indicative of its location by using at least one communication link between the INS module and the MIS/PIS (24 of FIG. 1), and substantially continuously broadcasts the set of absolute velocity/acceleration data indicative of its absolute velocity/acceleration using at least one communication link 32 between each INS module 20 and the MIS/PIS (24 of FIG. 1). In addition, preferably, the positional error data is also broadcast to the MIS/PIS, or to the tracking station 55. This allows to display the position (including the position error) of each member of personnel, or each movable object/robot in the tracking station display screen 53, and to communicate using the communication link 36 to each member of personnel its position when needed.

INS-generated data always degrades over time. When the positional error becomes intolerable (larger than the predetermined threshold), the subsequent re-calibration can be provided to any member of personnel if the member again approaches the MIS/PIS for re-calibration.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Therefore, it is intended that the scope of the invention be defined by the claims appended hereto and their equivalents, rather than by the foregoing description. All changes which come within the meaning and range of equivalency of the claims are to be embraced within their scope.

What is claimed is:

1. A position determination system for personnel members or movable objects integrating local acceleration data adjusted for a local gravitational factor, said system comprising:
    at least one portable position sensor, each said portable position sensor further comprising:
        an inertial navigation system (INS) module capable of determining said (INS) module acceleration data adjusted for said local gravitational factor;
        a portable wireless communication module; and
        a power source adapted to provide power to said portable position sensor;
    and
    a Mobile Initialization Station (MIS) capable of determining its position and velocity with high accuracy;
    wherein said high accuracy position and velocity data provided by said MIS and said acceleration data adjusted for said local gravitational factor provided by one said portable position sensor is processed in order to derive an INS positional data corresponding to each said INS module.

2. The position determination system of claim 1, wherein at least one said portable position sensor is built into a wearable item of a member of said personnel having an identification number ID_Number.

3. The position determination system of claim 1, wherein at least one said portable position sensor is embedded into a movable object having an ID_Object_Number.

4. The position determination system of claim 1, wherein at least one said portable position sensor further includes:
    a portable data processor;
    and
    a substantially continuous one-way communication link;
    wherein said portable position sensor is configured to substantially continuously receive said high accuracy position and velocity data from said high accuracy position determination device by using said one-way communication link;
    and wherein said portable data processor is configured to derive a set of INS positional data corresponding to said INS module based on said high accuracy position and velocity data provided by said Mobile Initialization Station (MIS) and based on said acceleration data adjusted for said local gravitational factor provided by said INS module.

5. The position determination system of claim 4;
    wherein said portable data processor derives said set of INS positional data corresponding to said INS module by incorporating said set of high accuracy velocity data provided by said Mobile Initialization Station (MIS) into said set of measured absolute acceleration data adjusted for said local gravitational factor provided by said INS module in order to generate a set of absolute velocity data indicative of an absolute velocity of said INS module; and by integrating said set of high accuracy positional data provided by said Mobile Initialization Station (MIS) into said set of absolute velocity data in order to generate a set of INS data including a set of absolute positional data indicative of location of said INS module.

6. The position determination system of claim 5;
    wherein said portable data processor generates a set of INS positional error data that indicates the degree of accuracy of said set of absolute INS positional data.

7. The position determination system of claim 6, wherein at least one said portable position sensor further includes:
 a memory block; said memory block is configured to record said set of INS positional data corresponding to said INS module over a first time period.

8. The position determination system of claim 7, wherein said memory block is further configured to record said set of INS positional error data that indicates the degree of accuracy of said set of absolute INS positional data over a second time period.

9. The position determination system of claim 6, wherein at least one said portable position sensor further includes:
 a display device configured to display a set of INS positional error data that indicates the degree of accuracy of said set of absolute INS positional data.

10. The position determination system of claim 5; wherein said portable data processor generates a set of INS absolute velocity/acceleration vector error data that indicates the degree of accuracy of said absolute velocity/acceleration vector of said INS module.

11. The position determination system of claim 5, wherein at least one said portable position sensor further includes:
 a display device configured to display said set of INS positional data corresponding to said INS module over a time period.

12. The position determination system of claim 4, wherein said one-way communication link further comprises:
 a network of short range transceivers configured to support substantially continuous communication between said Mobile Initialization Station (MIS) and at least one said portable position sensor.

13. The position determination system of claim 1, wherein at least one said portable position sensor further includes:
 a portable data processor;
 and
 a substantially continuous two-way communication link;
 wherein said portable position sensor is configured to substantially continuously receive said high accuracy position and velocity data provided by said Mobile Initialization Station (MIS) by using said two-way communication link;
 wherein said portable data processor is configured to derive a set of INS positional data corresponding to said INS module based on said high accuracy position and velocity data provided by said Mobile Initialization Station (MIS) and based on said acceleration data adjusted for said local gravitational factor provided by said INS module;
 and wherein said portable wireless communication module is configured to substantially continuously broadcast said set of INS positional data corresponding to said INS module by using said two-way communication link.

14. The position determination system of claim 13, wherein said portable wireless communication module is further configured to substantially continuously broadcast said set of INS positional error data corresponding to said INS module by using said two-way communication link.

15. The position determination system of claim 13, wherein said two-way communication link further comprises:
 a communication system selected from the group consisting of: {a Bluetooth communication system, an Ultra Wide Band (UWB) communication system, an (802.11 a) communication system, an (802.11 b) communication system, an (802.11 g) communication system, a LAN network, a WAN network, and a Wi-Fi network}.

16. The position determination system of claim 1 further including:
 a one-way communication link;
 and
 a tracking station further including:
 a data processor configured by using said one-way communication link to substantially continuously receive said high accuracy position and velocity data provided by said Mobile Initialization Station (MIS) and said acceleration data adjusted for a local gravitational factor provided by each said portable position sensor; and wherein said data processor is configured to derive an INS positional data including an INS positional error data corresponding to each said INS module.

17. The position determination system of claim 16, wherein said tracking station further includes:
 a display configured to display and to track each said INS module based on said INS positional data including said INS positional error data corresponding to one said INS module.

18. The position determination system of claim 17, wherein said tracking station is configured to substantially continuously communicate with each said INS module using said two-way communication link.

19. The position determination system of claim 18, wherein said tracking station further includes:
 an alarm device configured to communicate to each said INS module using said two-way communication link that its positional error data exceeds a predetermined threshold.

20. The position determination system of claim 1, wherein said Mobile Initialization Station (MIS) further comprises:
 a Mobile Initialization Station (MIS) transceiver unit selected from the group consisting of: {an integrated Satellite Positioning System (SATPS)/transceiver unit; an integrated Global Positioning System (GPS)/transceiver unit; and a TVPS transceiver unit};
 and
 a display device.

21. The position determination system of claim 1, wherein said Mobile Initialization Station (MIS) further comprises:
 an integrated Vector Global Positioning System (Vector GPS)/transceiver unit;
 and
 an orientation device;
 wherein said integrated Vector Global Positioning System (Vector GPS) is configured to determine an orientation vector and a velocity vector of said MIS;
 and wherein said orientation device is configured to use said orientation vector and said velocity vector of said MIS for an initial calibration of at least one said portable position sensor;
 and wherein said orientation device is configured to use said orientation vector and said velocity vector of said MIS for subsequent re-calibration of at least one said portable position sensor at time instances when at least one said portable position sensor includes a velocity vector substantially equal to said velocity vector of said MIS.

22. The position determination system of claim 21, wherein said orientation device further comprises:
 a cavity configured to hold said integrated INS/transceiver for initial calibration or for subsequent re-calibration of said portable position sensor.

23. The position determination system of claim 1, wherein said Mobile Initialization Station (MIS) further comprises:

a Portable Initialization Station (PIS) transceiver unit selected from the group consisting of: {an integrated Satellite Positioning System (SATPS)/transceiver unit; an integrated Global Positioning System (GPS)/transceiver unit; and a TVPS transceiver unit};
and
a display device.

24. The position determination system of claim 1, wherein at least one said portable position sensor further comprises:
a low power miniature INS integrated with a short range transceiver and built into a wearable item selected from the group consisting of: {shoes; an article of clothing; and a watch}.

25. A method for tracking movable objects or personnel objects by integrating local acceleration data adjusted for a local gravitational factor, each said movable object or a member of personnel including a portable position sensor; said method comprising:
providing at least one portable position sensor, wherein each said portable position sensor further comprises an inertial navigation system (INS) module;
using said INS module to determine said INS module acceleration data adjusted for said local gravitational factor;
using a Mobile Initialization Station (MIS)/Portable Initialization Station (PIS) to determine its position and velocity with high accuracy;
and
processing said high accuracy position and velocity data provided by said MIS/PIS and said acceleration data adjusted for said local gravitational factor provided by one said portable position sensor to derive an INS positional data corresponding to each said INS module.

26. The method of claim 25 further comprising the step of:
substantially continuously broadcasting each said set of INS data including said set of absolute positional data indicative of one said INS module location by using at least one communication link between each said INS module and said Mobile Initialization Station (MIS) or said Portable Initialization Station (PIS).

27. The method of claim 26 further including the step of:
substantially continuously broadcasting each said set of INS data including a set of absolute velocity/acceleration data indicative of said INS module absolute velocity/acceleration using said at least one communication link between each said INS module and said MIS or said PIS.

28. The method of claim 27 further including the steps of:
substantially continuously broadcasting said set of INS positional error data by using said at least one communication link between each said INS module and said MIS or said PIS;
and
substantially continuously broadcasting said set of INS absolute velocity/acceleration vector error data by using said at least one communication link between each said INS module and said MIS or said PIS.

* * * * *